(12) United States Patent
Kwatra et al.

(10) Patent No.: US 11,500,660 B2
(45) Date of Patent: Nov. 15, 2022

(54) SELF-LEARNING ARTIFICIAL INTELLIGENCE VOICE RESPONSE BASED ON USER BEHAVIOR DURING INTERACTION

(71) Applicant: International Business Machines Corporation, Armonk, NY (US)

(72) Inventors: Shikhar Kwatra, San Jose, CA (US); Sarbajit K. Rakshit, Kolkata (IN); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/953,423

(22) Filed: Nov. 20, 2020

(65) Prior Publication Data
US 2022/0164204 A1    May 26, 2022

(51) Int. Cl.
| | |
|---|---|
| *G06T 19/00* | (2011.01) |
| *G06F 9/00* | (2006.01) |
| *G06F 9/451* | (2018.01) |
| *G06F 3/16* | (2006.01) |
| *G06F 3/01* | (2006.01) |
| *G06N 5/04* | (2006.01) |

(52) U.S. Cl.
CPC .............. *G06F 9/453* (2018.02); *G06F 3/016* (2013.01); *G06F 3/167* (2013.01); *G06N 5/04* (2013.01); *G06T 19/006* (2013.01)

(58) Field of Classification Search
CPC .......... G06F 9/453; G06F 3/016; G06F 3/167; G06N 5/04
USPC ........................................................ 345/633
See application file for complete search history.

(56) References Cited

U.S. PATENT DOCUMENTS

| | | |
|---|---|---|
| 8,885,882 B1 | 11/2014 | Yin et al. |
| 10,504,384 B1 | 12/2019 | Drake |
| 2006/0093998 A1 | 5/2006 | Vertegaal |

(Continued)

FOREIGN PATENT DOCUMENTS

| | | |
|---|---|---|
| CN | 106774874 A | 5/2017 |
| WO | 2012051605 A2 | 4/2012 |

OTHER PUBLICATIONS

Anonymous, "Method and System for Skill based Learning for Culinary Instruction," IP.com No. IPCOM000252807D, IP.com Electronic Publication Date: Feb. 13, 2018 (5 pages).

(Continued)

*Primary Examiner* — Hai Tao Sun
(74) *Attorney, Agent, or Firm* — Cantor Colburn LLP; Erik Johnson

(57) ABSTRACT

A system is provided for recommending guidance instructions to a user. The system includes a memory having computer readable instructions and a processor for executing the computer readable instructions. The computer readable instructions control the processor to perform operations of monitoring an ongoing task comprising at least one act performed by a user, generating image data depicting the ongoing task, and displaying the ongoing task based on the image data. The system analyzes the ongoing task and generates an augmented image. The augmented image is overlaid on the image data so that the augmented image is displayed simultaneously with the ongoing task to direct the user to progress the ongoing task.

14 Claims, 17 Drawing Sheets

(56) References Cited

U.S. PATENT DOCUMENTS

| | | |
|---|---|---|
| 2006/0192775 A1 | 8/2006 | Nicholson et al. |
| 2006/0256083 A1 | 11/2006 | Rosenberg |
| 2009/0259687 A1 | 10/2009 | Do et al. |
| 2012/0300061 A1 | 11/2012 | Osman et al. |
| 2013/0117204 A1 | 5/2013 | Vadlamani et al. |
| 2016/0253915 A1 | 9/2016 | Lee et al. |
| 2016/0371992 A1 | 12/2016 | Kozloski et al. |
| 2017/0116580 A1 | 4/2017 | Kim et al. |
| 2018/0016003 A1 | 1/2018 | Chefalas et al. |
| 2018/0137359 A1* | 5/2018 | Dayal ................. G06F 3/0304 |
| 2019/0362556 A1* | 11/2019 | Ben-Dor ............ G06K 7/10396 |
| 2020/0043355 A1 | 2/2020 | Kwatra |
| 2021/0004981 A1* | 1/2021 | Song ..................... H04N 5/272 |

OTHER PUBLICATIONS

Examination Report issued in Application No. GB2115855.5; Application Filing Date Nov. 4, 2021; dated May 3, 2022 (6 pages).

* cited by examiner

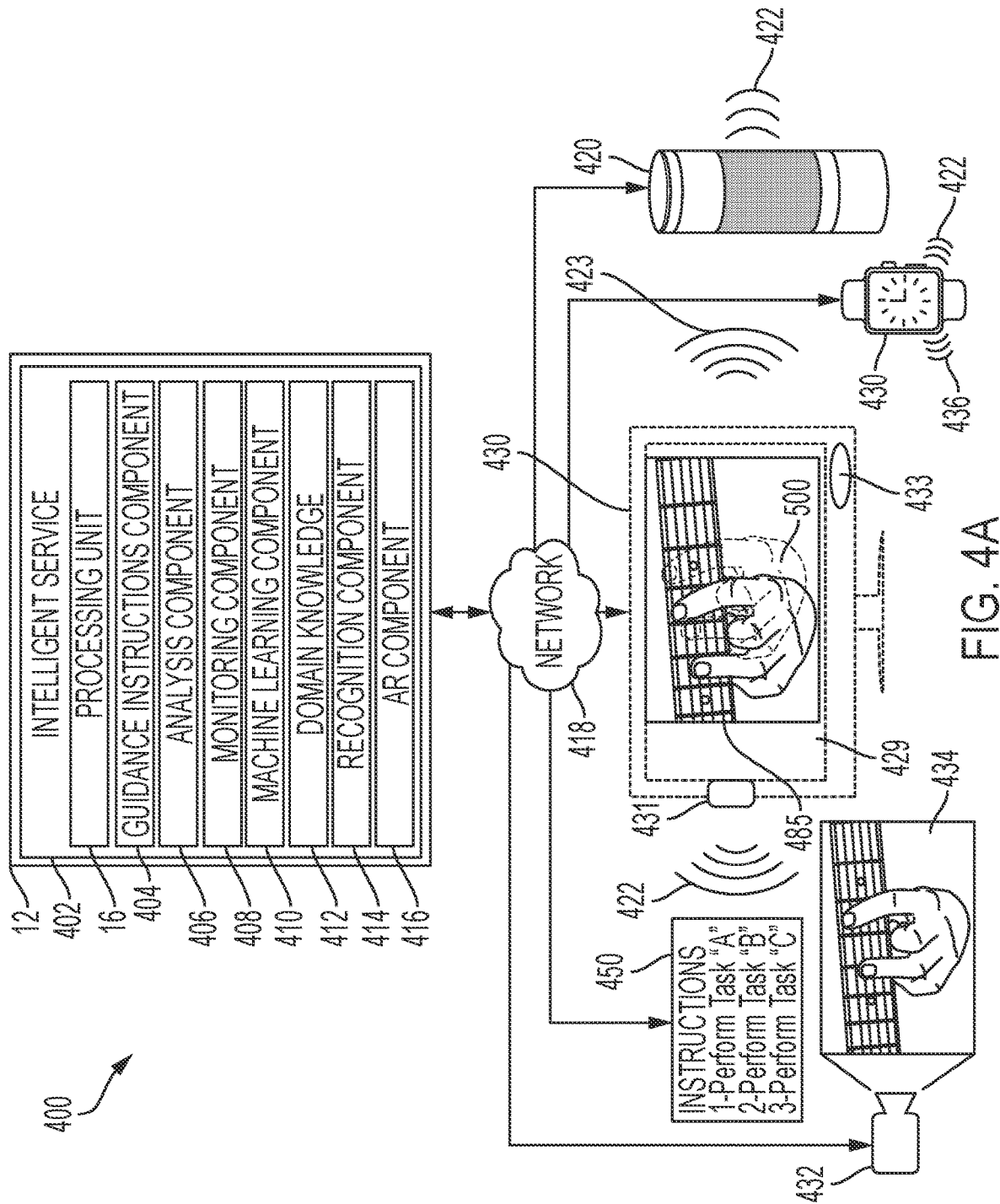

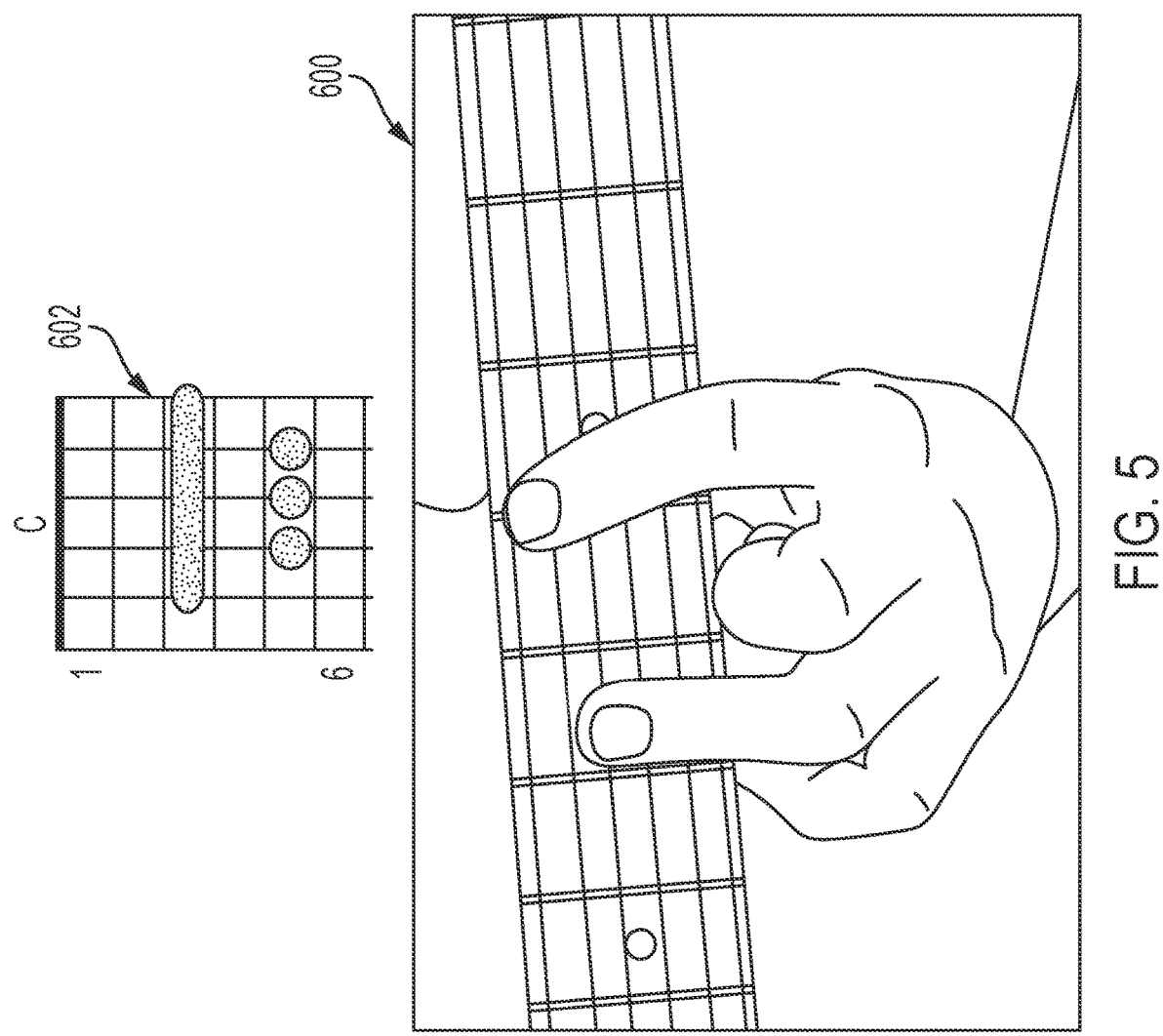

SELF-LEARNING ARTIFICIAL INTELLIGENCE VOICE RESPONSE BASED ON USER BEHAVIOR DURING INTERACTION

BACKGROUND

The invention relates generally to artificial intelligence (AI) computing systems and, more specifically, AI recommendation of guidance instructions to a user.

Voice response systems are becoming very popular. Typically, voice response systems monitor ambient audio for voice commands from users. The voice commands direct the voice response systems to execute specific actions and to provide auditory responses to the user. In some cases, the actions taken by the voice response system and the responses provided to the user can be inaccurate based on the user's intended context because the AI used by the voice response system misunderstood the words that made up the voice command.

SUMMARY

According to a non-limiting embodiment, a system is provided for recommending guidance instructions to a user. The system includes a memory having computer readable instructions and a processor for executing the computer readable instructions. The computer readable instructions control the processor to perform operations of monitoring an ongoing task comprising at least one act performed by a user, generating image data depicting the ongoing task, and displaying the ongoing task based on the image data. The system analyzes the ongoing task and generates an augmented image. The augmented image is overlaid on the image data so that the augmented image is displayed simultaneously with the ongoing task to direct the user to progress the ongoing task.

According to another non-limiting embodiment, a method for recommending guidance instructions to a user comprises monitoring an ongoing task comprising at least one act performed by a user, generating image data depicting the ongoing task, and displaying the ongoing task based on the image data. The method further comprises analyzing the ongoing task, generating an augmented image, and overlaying the augmented image on the image data so that the augmented image is displayed simultaneously with the ongoing task to direct the user to progress the ongoing task.

According to yet another non-limiting embodiment, a computer program product is provided for recommending guidance instructions to a user. The computer program product comprises a computer readable storage medium having program instructions embodied therewith. The program instructions readable by a processing circuit to cause the processing circuit to perform operations comprising monitoring an ongoing task comprising at least one act performed by a user, generating image data depicting the ongoing task, and displaying the ongoing task based on the image data. The operations further comprises analyzing the ongoing task, generating an augmented image, and overlaying the augmented image on the image data so that the augmented image is displayed simultaneously with the ongoing task to direct the user to progress the ongoing task.

Additional features and advantages are realized through the techniques of the invention. Other embodiments and aspects of the invention are described in detail herein are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

FIG. 4A depicts an AI user activity guidance system according to one or more embodiments of the present invention;

FIG. 5 depicts a learned modeled user activity according to one or more embodiments of the present invention;

DETAILED DESCRIPTION

Figure 1:
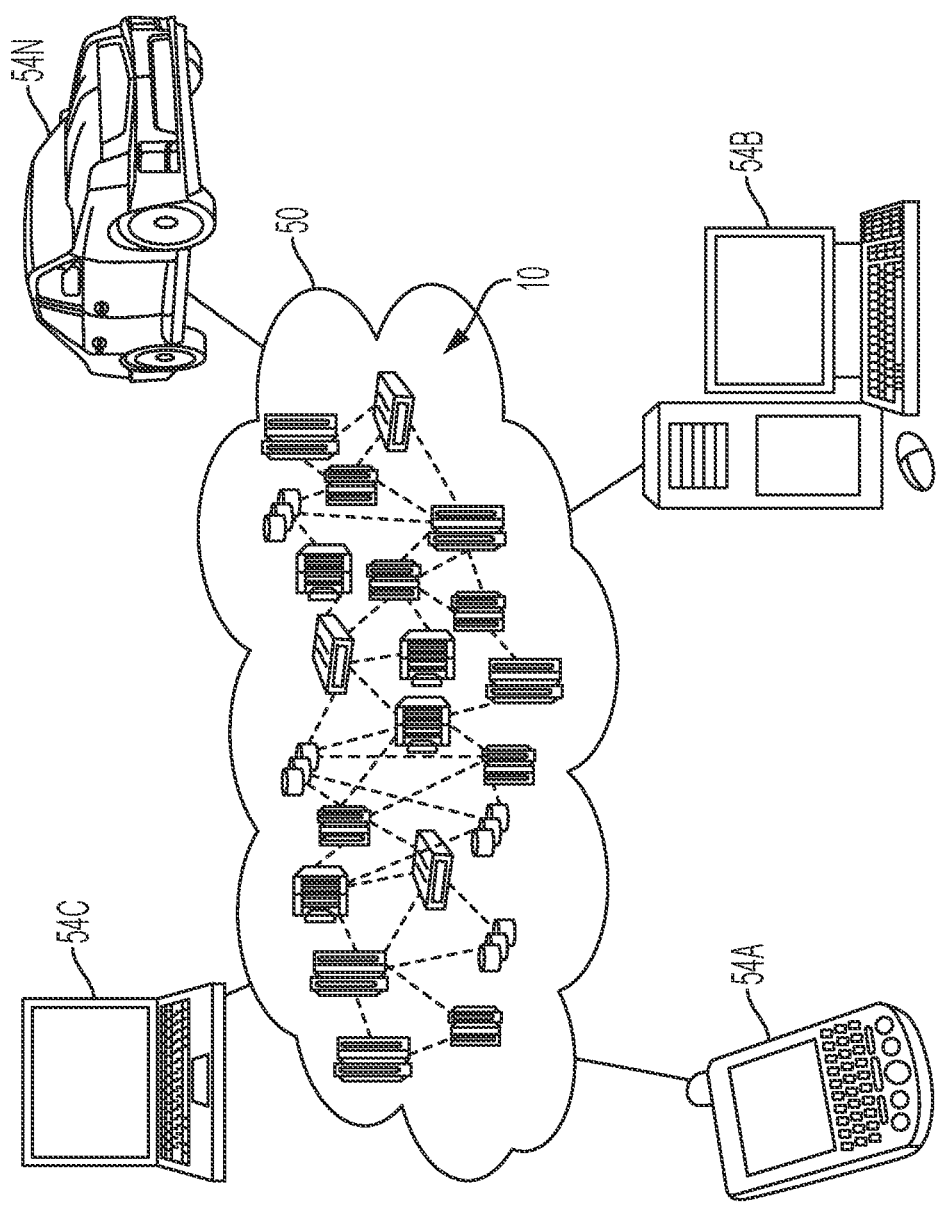
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Turning now to an overview that is more specifically relevant to aspects of the invention, hand-related activities such as cooking, stitching, creative handcrafting, and musical instrument manipulation, for example, typically involve performing several steps or acts to progress an ongoing task or complete a desired task. A song, for example, typically includes an arrangement of several different chords or notes. To perform a desired song, a user must perform several different acts to manipulate an instrument in a manner that achieves the correct chords or notes needed to complete the task, i.e., to properly perform the song. When attempting to play the song, however, the user of the instrument may not realize they are playing the wrong chord or note. Similarly, when first learning a new song, one may not know the next chord or note progression needed to accurately progress the task, i.e., continue playing the song. Conventional techniques require a user to stop the task and move their attention from the instrument to a song sheet in order to determine the next chord or note progression. This act is typically performed several times before one memorizes the act, and thus increases the time needed for one to complete the task, i.e., correctly perform the song.

One or more non-limiting embodiments described herein provides an AI user activity guidance system capable of learning various different user acts necessary for performing a given task, monitoring a user's acts performed in real-time, and recommending guidance to the user on how to correctly perform one or more of the acts to progress or complete the task. In one or more non-limiting embodiments, the AI user activity guidance system performs imaging of a user's acts while they perform the task in real-time and detects an incorrectly performed act. A display is provided that displays images of the user performing the acts of the task in real-time. In response to detecting the incorrectly performed act, the AI user activity guidance system generates a haptic alert that alerts the user that a current act is performed incorrectly, and generates a recommendation output indicating a correction to the incorrectly performed act. The recommendation output includes spoken directions guiding the user on how to correct the incorrectly performed act and/or an augmented image that is overlaid atop the displayed image of the ongoing task indicating the correct act. In this manner, the user can easily correct their act without stopping and/or moving their attention from the ongoing task.

With reference now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
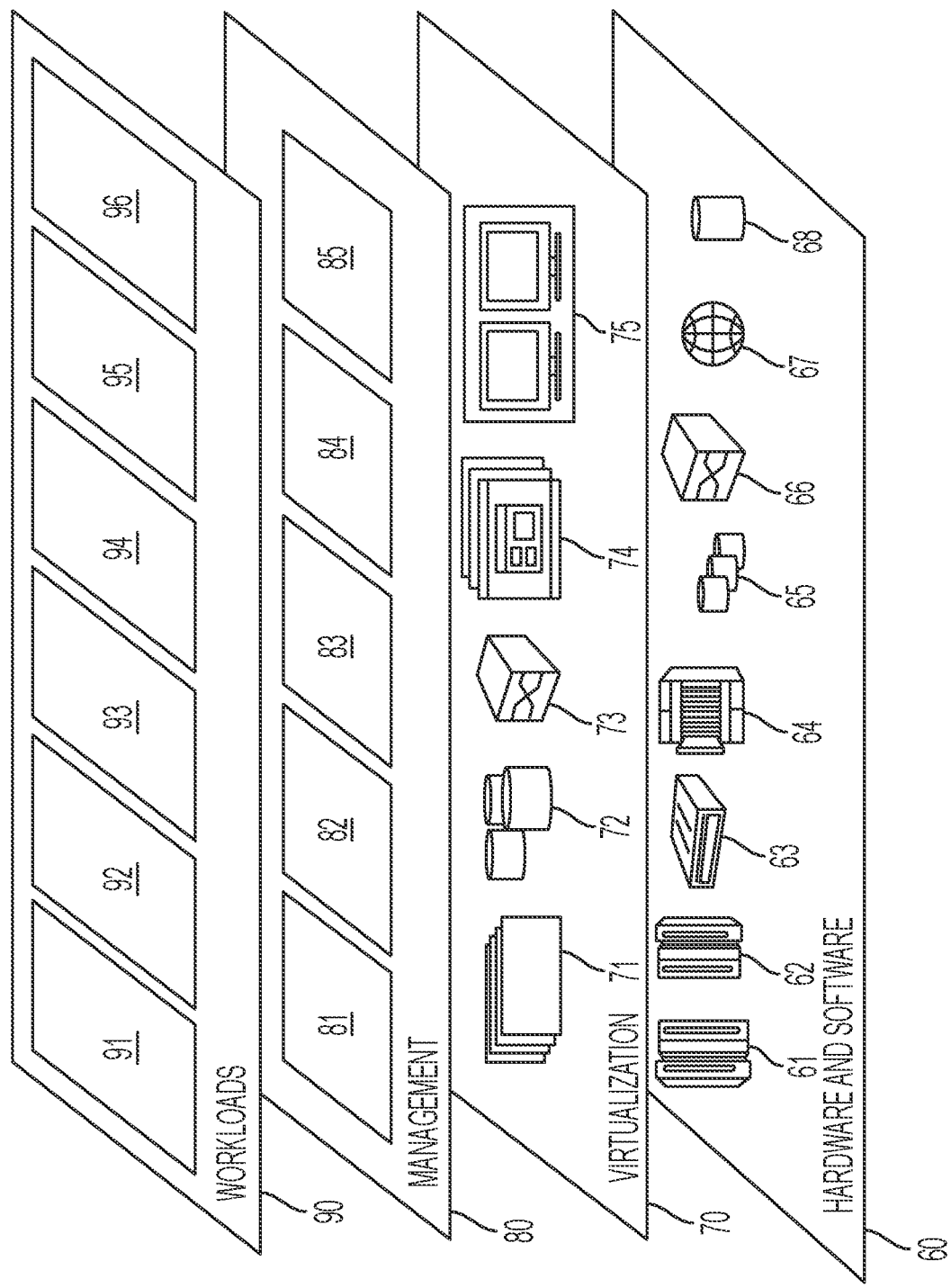
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training an artificial intelligence (AI) of a voice response system 96.

Figure 3:
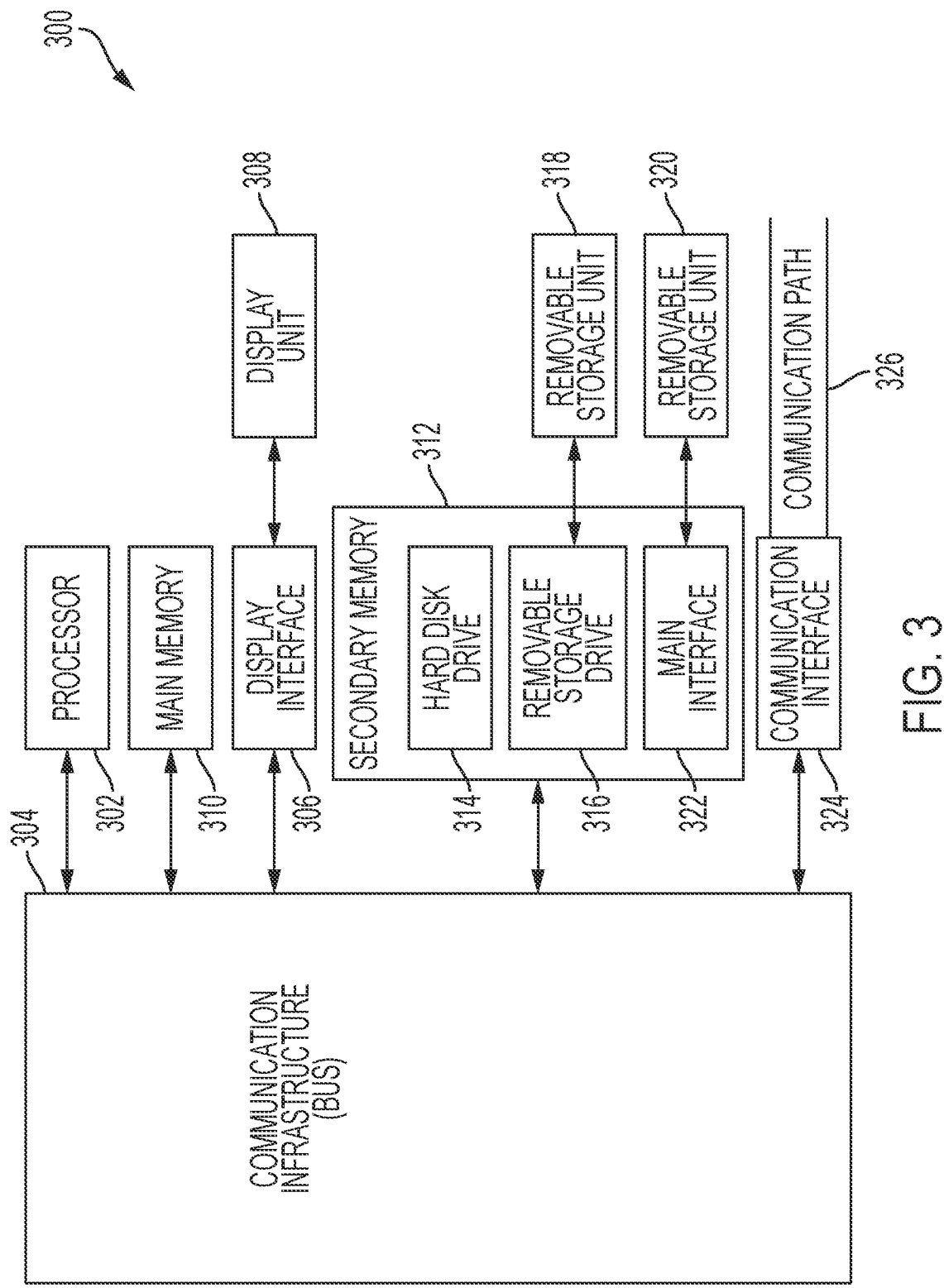
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, a system for training an artificial intelligence (AI) of a voice response system is provided. In exemplary embodiments, a voice response system is configured to monitor ambient audio for a voice command from a user. The voice response system uses an AI to interpret the voice command, and based on the interpretation, the voice response system provides a response to the user and/or performs an action requested by the user. The voice response system is also configured to monitors the reaction of the user to the response provide or action taken by the voice response system. The reaction can be monitored using microphones and/or cameras in communication with the voice response system. The voice response system analyzes the reaction of the user and determines whether the user is satisfied with the response provided or the action taken. If the user is not satisfied with the response provided or the action taken, the voice response system updates the AI model used to interpret the voice commands.

Turning now to FIG. 4A, an AI user activity guidance system 400 is illustrated according to a non-limiting embodiment. The AI user activity guidance system 400 includes a computing system 12 in signal communication with functional components. The functional components include, but are not limited to, one or more computing devices 430, an imaging device 432 and a voice activated hub 420. Each of the devices, components, modules, and/or functions described in FIGS. 1-3 may also apply to the devices, components, modules, and functions of FIG. 4A. Also, one or more of the operations and steps of FIGS. 1-3 can also be included in one or more operations or actions of FIG. 4A.

Figure 4B:
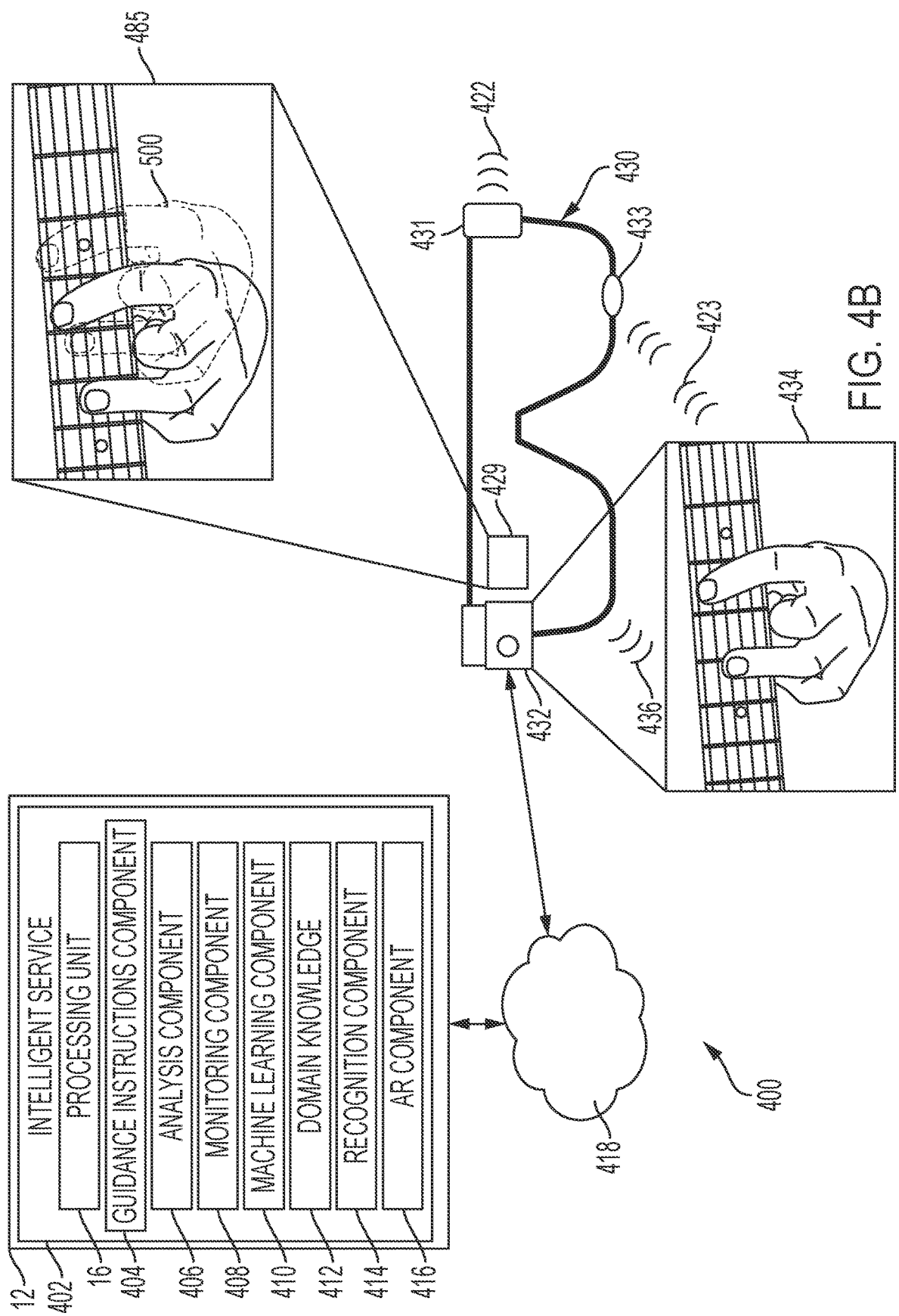
FIG. 4B depicts an AI user activity guidance system according to one or more embodiments of the present invention.

Referring to FIG. 4B, an AI user activity guidance system 400 is illustrated according to another non-limiting embodiment. In the non-limiting embodiment shown in FIG. 4B, several components of the AI user activity guidance system 400 are integrated into a single smart wearable computing device 430 (e.g., smart glasses 430). As the AI user activity guidance system 400 operates in a similar manner to the AI user activity guidance system 400, details of the individual components described below are also applicable to the AI user activity guidance system 400.

The computing devices 430 include, but are not limited to, a television, smartphone, desktop computer, laptop computer, tablet, smartwatch, smart wearable device, and/or another electronic/wireless communication device that may have one or more processors, memory, and/or wireless communication technology for displaying/streaming audio/video data. The computing devices 430 can receive inputs (e.g., touch inputs, spoken inputs, mouse clicks, etc.) that can control the AI user activity guidance system 400. In one or more non-limiting embodiments, the inputs can indicate the type of task to be performed by the user. The task includes, for example, cooking, stitching, creative handcrafting, and musical instrument manipulation (i.e., playing a musical instrument). In terms of musical instrument manipulation, for example, the input can indicate a song to be played, the type of instrument that will be used to play the song, and/or the tuning of the instrument. In addition, the input can include a difficulty level of the task to be performed. In terms of musical instrument manipulation, for example, a beginner's level difficulty associated with playing a song via a musical instrument may include correctly performing barre chords or power chords, while an advanced level of playing the same song may include correctly performing the same chords as open major/minor chords.

The imaging device 432 includes, but is not limited to, a camera or video recorder. Accordingly, the imaging device 432 is capable of capturing images of an ongoing task 434 (i.e., a task performed in real-time). The intelligent service 402 can work in conjunction with the imaging device 432 to perform image recognition operations. For instance, the intelligent service 402 can monitor images of an ongoing task 432 and detect whether an act is performed correctly or incorrectly. The intelligent service 402 can monitor the images of an ongoing task 432 and predict the next act included in the ongoing task 432.

The voice activated hub 420 includes, for example, a personal assistant internet of things (IoT) computing device. The voice activated hub 420 can detect voice-activated commands and/or queries and output spoken language that includes answers, guidance, recommendations, etc.

Computer system/server 12 is again shown, which may incorporate an intelligent service 402 or "intelligent recommendation of guidance instructions service 402" (e.g., an Artificial Intelligence Simulated Humanoid Assistant "A.I.S.H.A."). As illustrated in FIG. 4A, the computer system/server 12 may provide virtualized computing services (i.e., virtualized computing, virtualized storage, virtualized networking, etc.) to one or more computing devices, as described herein. More specifically, the computer system/server 12 may provide virtualized computing, virtualized storage, virtualized networking, and other virtualized services that are executing on a hardware substrate.

The intelligent service 402 (e.g., intelligent recommendation of guidance instructions service 402) depicted in FIG. 4A is in communication with and/or association with the computing devices 430, the imaging device 432 and the voice activated hub 420. Accordingly, the intelligent recommendation of guidance instructions service 402, the computing devices 430, the imaging device 432, and the guidance voice activated hub 420 can each be associated with and/or in communication with each other, by one or more communication methods, such as a computing network, wireless communication network, or other network means enabling communication (each collectively referred to in FIG. 4A as "network 18"). According to a non-limiting embodiment, the intelligent recommendation of guidance instructions service 402 may be installed locally on the voice activated hub 420 and/or the computing devices 430. Alternatively, the intelligent recommendation of guidance instructions service 402 may be located external to (e.g., via a cloud computing server) the voice activated hub 420 and/or the computing devices 430.

The intelligent recommendation of guidance instructions service 402 may incorporate processing unit 16 to perform various computational, data processing and other functionality in accordance with various non-limiting embodiments of the present invention. A domain knowledge 412 (e.g., a database that may include an ontology) is shown, along with a guidance instructions component 404, an analysis component 406, a monitoring component 408, a machine learning component 410, a recognition component 414, and/or an augmented reality (AR) component 416. In one or more non-limiting embodiments, an one of the guidance instructions component 404, analysis component 406, monitoring component 408, machine learning component 410, recognition component 414, domain knowledge 412, and/or augmented reality (AR) component 416 is constructed as an electronic hardware controller that includes memory and a processor configured to execute algorithms and computer-readable program instructions stored in the memory. In addition, the guidance instructions component 404, analysis component 406, monitoring component 408, machine learning component 410, recognition component 414, domain knowledge 412, and/or an augmented reality (AR) component 416 can all be embedded or integrated as a single controller.

The domain knowledge 412 may include and/or be associated with an ontology of concepts, keywords, expressions representing a domain of knowledge. A thesaurus or ontology may be used as the database and may also be used to identify semantic relationships between observed and/or unobserved variables by the machine learning component 410 (e.g., a cognitive component). According to a non-limiting embodiment, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. According to a non-limiting embodiment, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology. In one or more non-limiting embodiments, the domain knowledge stores learned model acts, which include images indicative of exemplary or correct performances of an act included in a given task. In terms of musical instrumentation, for example, the learned model acts can include images showing how to play the correct chord or note of a given instrument.

Additionally, the domain knowledge 412 may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, and/or criteria.

The analysis component 406 of the computer system/server 12 can work in concert with processing unit 16 to accomplish various embodiments of the present invention. For example, analysis component 406 may undergo various data analytics functions to analyze data communicated from one or more devices such as, for example, the voice activated hub 420 and/or the computing device 430.

The analysis component 406 may receive and analyze each physical property associated with media data (e.g., audio data and/or video data). The analysis component 406 may cognitively receive and/or detect audio data and/or video data for the guidance instructions component 404.

The analysis component 406, the monitoring component 408, and/or the machine learning component 410 may access and monitor one or more audio data sources and/or video data sources (e.g., website, audio storage systems, video storage systems, cloud computing systems, etc.) to provide the audio data, video data, and or text data for providing guidance instructions for performing a task. The analysis component 406 may cognitively analyze the data retrieved from the domain knowledge 412, one or more online sources, a cloud computing system, a text corpus, or a combination thereof. The analysis component 406 and/or the machine learning component 410 may extract one or more keywords, phrases, instructions, and/or transcripts (e.g., transcribe audio data into text data) using natural language processing ("NLP").

As part of detecting the data, the analysis component 406, the monitoring component 408, and/or the machine learning component 410 can identify, from one or more sources audio data, video data, text data, and/or contextual factors associated with the audio data, video data, and/or text data, or a combination thereof. Also, the machine learning component 410 can initiate a machine learning operation to learn the contextual factors associated with the audio data, video data, and/or text data associated with guidance instructions for performing a task such as, for example, assembling and/or fixing/repairing an item (e.g., assembling a new bicycle or fixing a computer).

The monitoring component 408 can monitor the performance of the ongoing task 434 in real-time via the imaging device 432 and one or more user sounds/words 423 (via a microphone 433 and/or the vocal hub 420) while performing the task 434. The recognition component 414 may recognize a user performing the task 434 on an item using the voice activated hub 420 and/or the computing device 430. For example, the voice activated hub 420 the computing device 430 and/or the imaging device 432 can identify one or more activities, bodily movements and/or features (e.g., facial recognition, facial expressions, hand/feet gestures, etc.), behaviors, audio data (e.g., voice detection and/or recognition), environmental surroundings, or other defined parameters/features that may identify, locate, and/or recognize a user and/or a task being performed by the user. The analysis component 406 can work in conjunction with the monitoring component to perform image recognition to recognize each and every object in a given image or video clip among the objects in each frame.

In one or more non-limiting embodiments, the monitoring component 408 can detect an incorrectly performed act included in ongoing task 434. In response to detecting the incorrect act and/or the next, the monitoring component can command the one or more computing devices 430 to generate a haptic alert 436 that alerts the user that the current act is being performed incorrectly. Similarly, the monitoring component 408 can predict the next act to be performed in the ongoing task 434 and generate a haptic alert 436 that alerts the user of the next act to be performed.

The guidance instructions component 404 may provide one or more guidance instructions for assisting with performing the selected task according to identified contextual factors. The guidance instructions may be text data, audio data, and/or video data. For example, the voice activated hub 420 may audibly communicate the guidance instructions 422. The computing devices 430 may provide guidance instructions 450 along with image/video data 485 displayed by the graphical user interface ("GUI") of the computing device 430 and/or as vocalized instructions output from a speaker 431.

The guidance instructions component 404 may cognitively guide the user to perform the selected task using the one or more guidance instructions 422. The guidance instructions component 404 may provide a sequence of guidance instructions 422 retrieved from a domain knowledge, one or more online sources, a cloud computing system, a text corpus, or a combination thereof. The guidance instructions component 404 may provide media data from one or more online sources, a cloud computing system, or a combination thereof.

The guidance instructions component 404 may verify each step of the one or more guidance instructions 422 for assisting with performing the selected task. The guidance instructions component 404 may also identify a level of difficulty (e.g., a level of stress, frustration, anxiety, excitability, or other emotional responses) realized by the user while performing a set of tasks associated with the one or more guidance instructions 422 delivered via streamed media, pause/stop/terminate delivery of the streamed media for a selected period of time, and/or provide the user with a modified set of guidance instructions 422 to guide the user through an enhanced level of instructions.

The guidance instructions component 404 may provide additional guidance information relating to the guidance instructions 422 collected from a domain knowledge, one or more online sources, a cloud computing system, a text corpus, or a combination thereof for performing the selected task. For example, if a first set of instructions are insufficient for the user, an additional set that may further explain one or more of the original instructions may be provided.

According to one or more non-limiting embodiments, the guidance instructions component 404 can also work together with the AR component 416 to provide enhanced guidance instructions 422 for assisting with performing the selected task. More specifically, the AR component 416 can generate an augmented image 500 that is overlaid on real-time image/video data 485 displayed on a graphical user interface (GUI) 429. Accordingly, the augmented image 500 is displayed with the ongoing task 434 such that the augmented image 500 shows the user how to correct an incorrectly performed act. In this manner, the user can easily correct their act without stopping and/or moving their attention from the ongoing task 434. In another non-limiting embodiment, the augmented image 500 can show the user how to correctly perform the next act included in an ongoing task 434.

The intelligent recommendation of guidance instructions service 402 may adjust a tone, volume, pace of the speech and/or frequency of the guidance instructions 422 audio/media data based on the speed/pace of a user following the guidance instructions 422. Also, words, phrases, and/or complete sentences (e.g., all or portions of a conversation) by other parties relating to the audio data may be transcribed in a text form based on an NLP extraction operation (e.g., NLP based keyword extraction). The text data may be relayed, sent, stored, or further processed so that the same audio/video data (e.g., all or portions of the conversations) may be heard or listened to while simultaneously providing the text version of the guidance instruction.

As previously indicated, the intelligent recommendation of guidance instructions service 402 can also communicate with other linked devices such as, for example, the voice activated hub 420, the computing devices 430, and/or the imaging device 432. Moreover, the analysis component 406 and/or the machine learning component 410 can access one or more online data sources such as, for example, a social media network, website, or data site for providing one or more guidance instructions 422 for assisting with performing the selected task according to identified contextual factors. That is, the analysis component 406, the recognition component 414, and/or the machine learning component 410 can learn and observe, for a user, a degree or level of attention, a level difficulty by a user in performing a task, a type of response, and/or feedback as to various topics and/or guidance instructions 422. The learned and observed behavior of the user may be linked to various data sources that provide personal information, social media data, or user profile information to learn, establish and/or determine a confidence factor relating to the performance of the guidance instructions 422.

In one or more non-limiting embodiments, the observation of other people's (user's) reactions to the same methods can be used by AI user activity guidance system 400 to understand learning and recommend acts for the user. Iterative feedback between crowd-sourced data and the user in focus can then be utilized to make intelligent decisions on the usage path and projection of a given task. In addition, the AI user activity guidance system 400 can actively alter the expected path of an on-going task based on learning success rates.

According to a non-limiting embodiment, the machine learning component 410, as described herein, may be performed by a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

According to a non-limiting embodiment, the intelligent recommendation of guidance instructions service 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.) Thus, as used herein, a calculation operation may include all or part of the one or more mathematical operations.

According to a non-limiting embodiment, if the task that the user wants to perform is initially unable to be detected, a user may provide (e.g., verbally via the voice activated hub 420 and/or microphone 433 and/or via the interactive GUI 429 interface of the computing device 430 activity data into the intelligent recommendation of guidance instructions service 402 as an input so that the intelligent recommendation of guidance instructions service 402 may start with object scanning, instruction scanning (after downloading into the corpus if it hasn't done already) and guiding the step-by-step instructions to the user based on monitoring the activity of the user.

Figure 6:
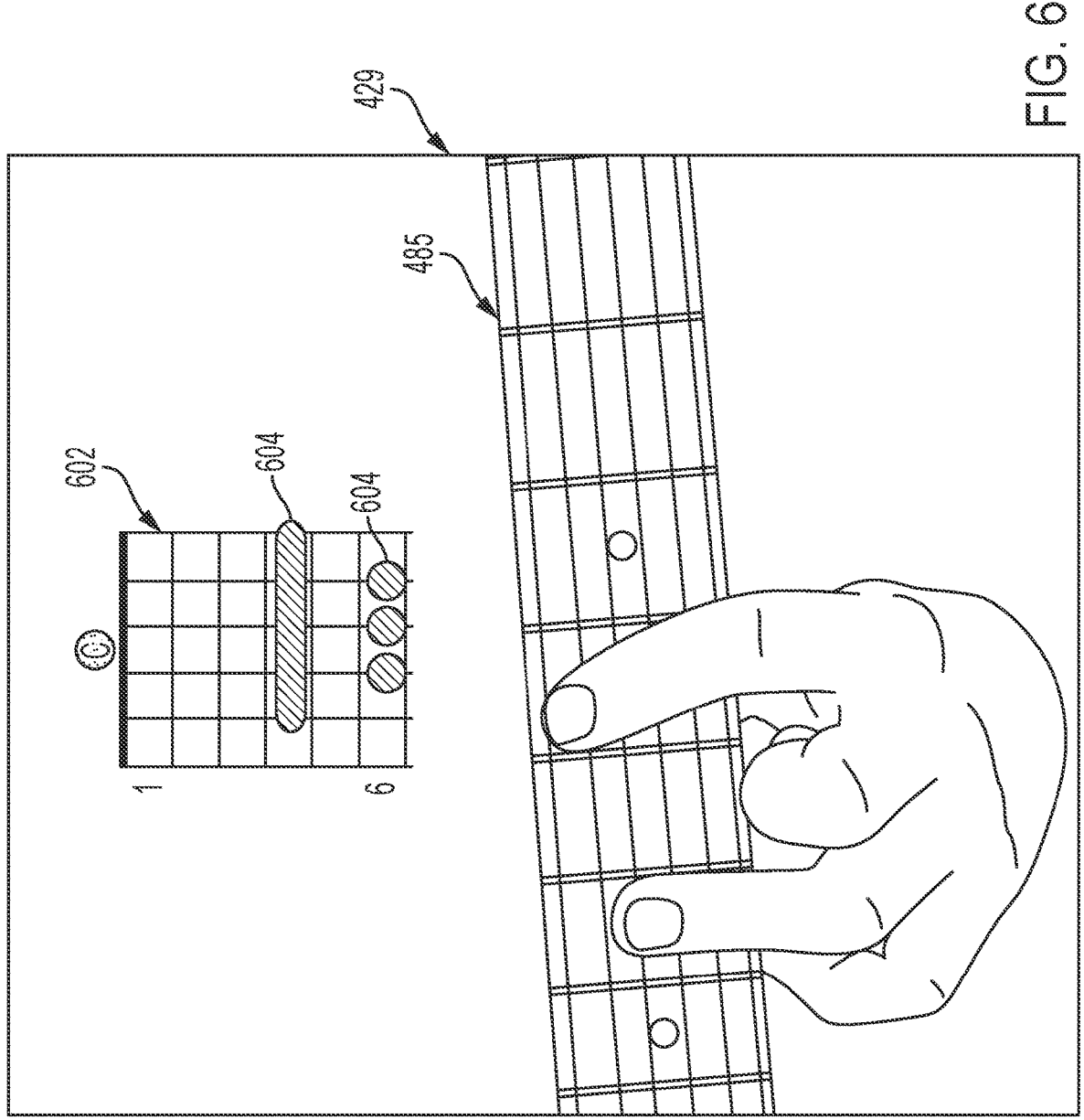
FIG. 6 depicts an incorrectly performed user activity according to one or more embodiments of the present invention.
Figure 7:
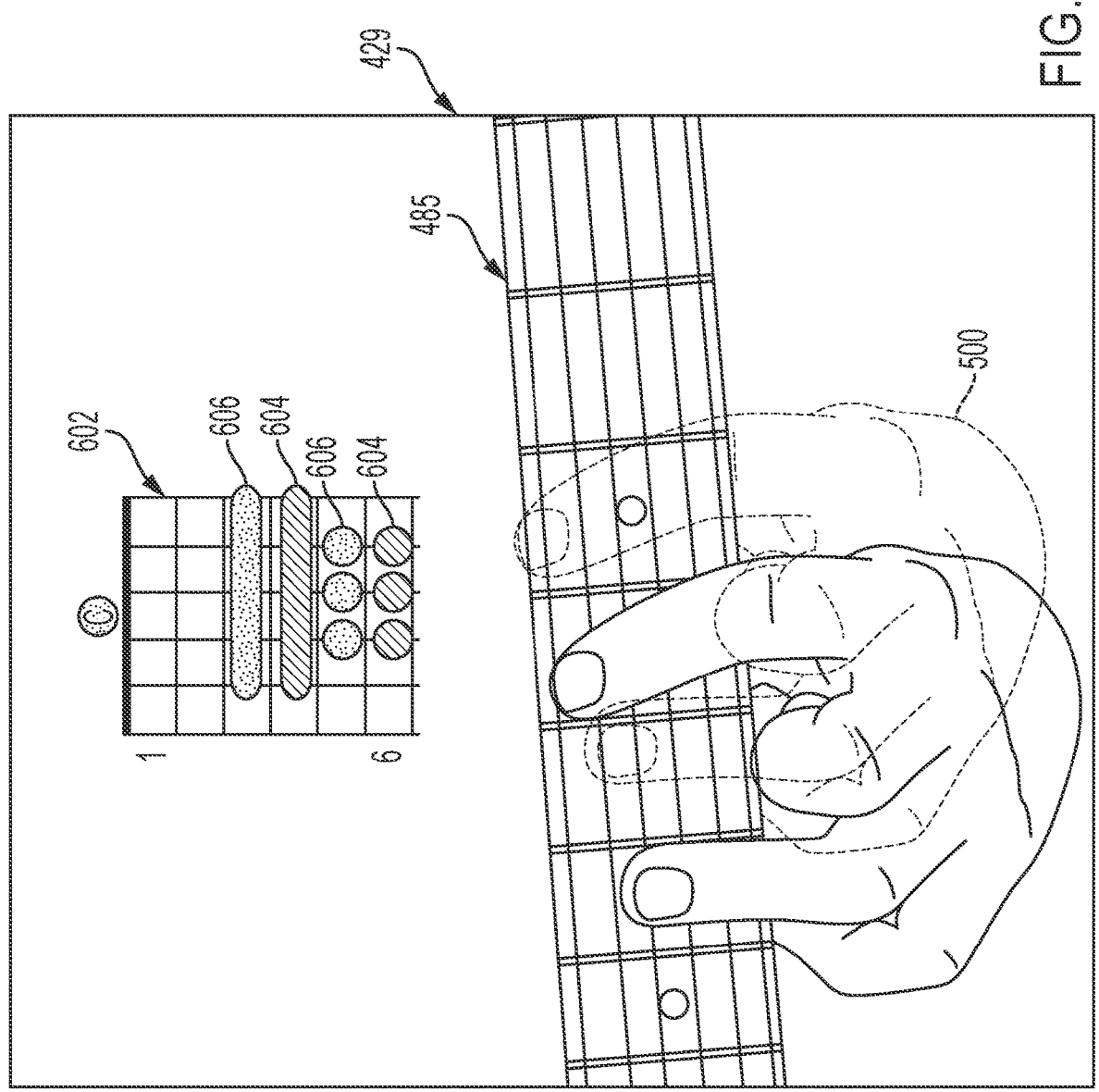
FIG. 7 depicts an image of the incorrectly performed user activity overlaid with the correct modeled user activity according to one or more embodiments of the present invention.

As described herein, the AI user activity guidance system 400 includes an AR component 416 configured to generate an augmented image 500 that is overlaid on real-time image/video data to provide enhanced guidance instructions 422 for assisting a user to perform a task. FIGS. 5, 6 and 7 collectively depict an example of a task as a user playing guitar.

Turning first to FIG. 5, a learned modeled user activity is depicted according to one or more embodiments of the present invention. The learned modeled user activity 600 in this example is a learned correctly played guitar barre chord 600 (e.g., a bane C chord 600). The correctly played guitar bane chord 600 can be learned by the machine learning component 410 as described herein and stored in the domain knowledge 412 for future reference by the AI user activity guidance system 400 (e.g., the AR component 416). A chord diagram 602 corresponding to the correctly played guitar barre chord 600 can also be stored in the domain knowledge 412 for future reference by the AI user activity guidance system 400.

FIG. 6 depicts a GUI 429 displaying image/video data 485 of an ongoing task 434 (e.g., a user playing a desired song on a guitar) performed in real-time, where the user incorrectly performs a user activity included in the task 434. In this example, the incorrect user activity is an incorrectly performed guitar bane chord (e.g., an incorrect bane C chord). In one or more non-limiting embodiments, the GUI 429 can also display a chord diagram 602 including indicators 604 indicating the actual guitar strings played by the user. In one or more embodiments, the display of the indicators (e.g., color, shape, etc.) can be changed to indicate which specific guitar strings are incorrectly played.

FIG. 7 depicts the GUI 429 displaying an augmented image 500 that is overlaid on real-time image/video data 485. As described herein, the augmented image 500 shows the user how to correct the incorrectly performed act. In this example, the augmented image 500 shows the user how to correctly perform the guitar barre chord (e.g., the correct barre C chord) in order to correctly progress the task or complete the task, e.g., correctly play the song. Accordingly, the user can easily correct their act without stopping and/or moving their attention away from the guitar. In one or more non-limiting embodiments, the GUI 429 can also display a chord diagram 602 including correction indicators 606 indicating the guitar strings that should be played to correctly play the song.

Figure 8:
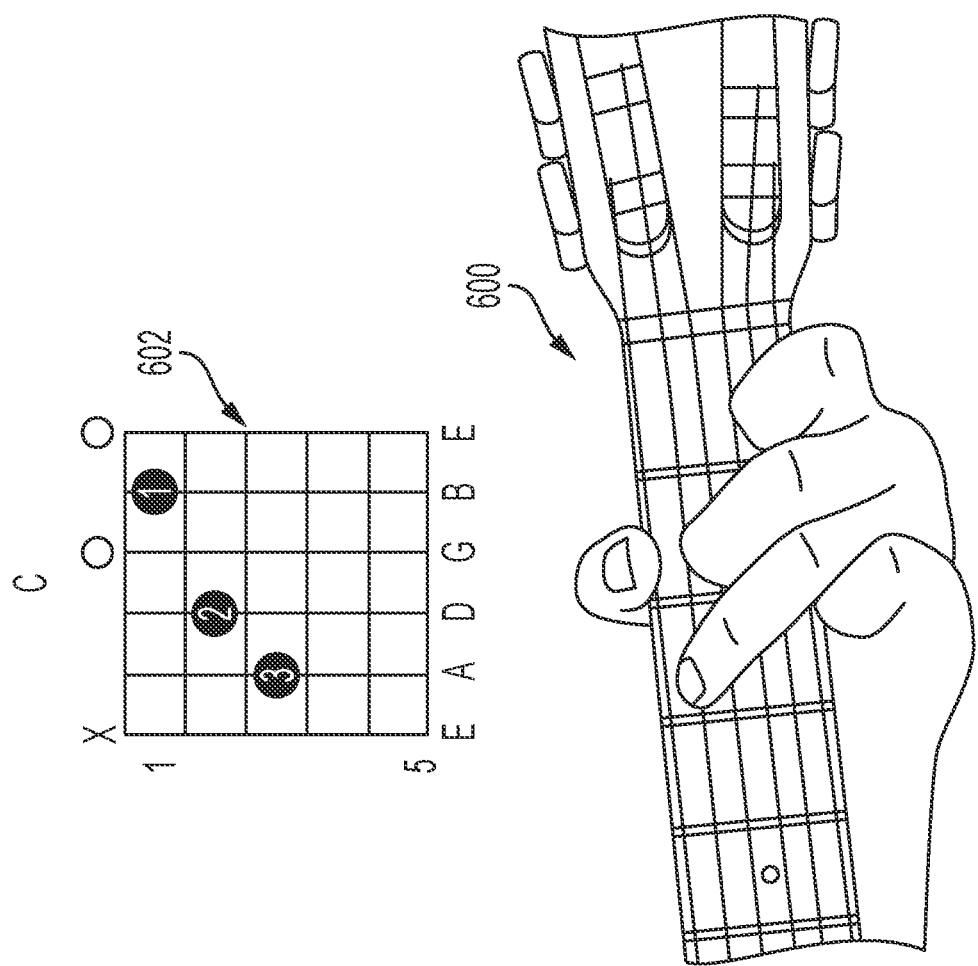
FIG. 8 depicts a learned modeled user activity according to one or more embodiments of the present invention.
Figure 9:
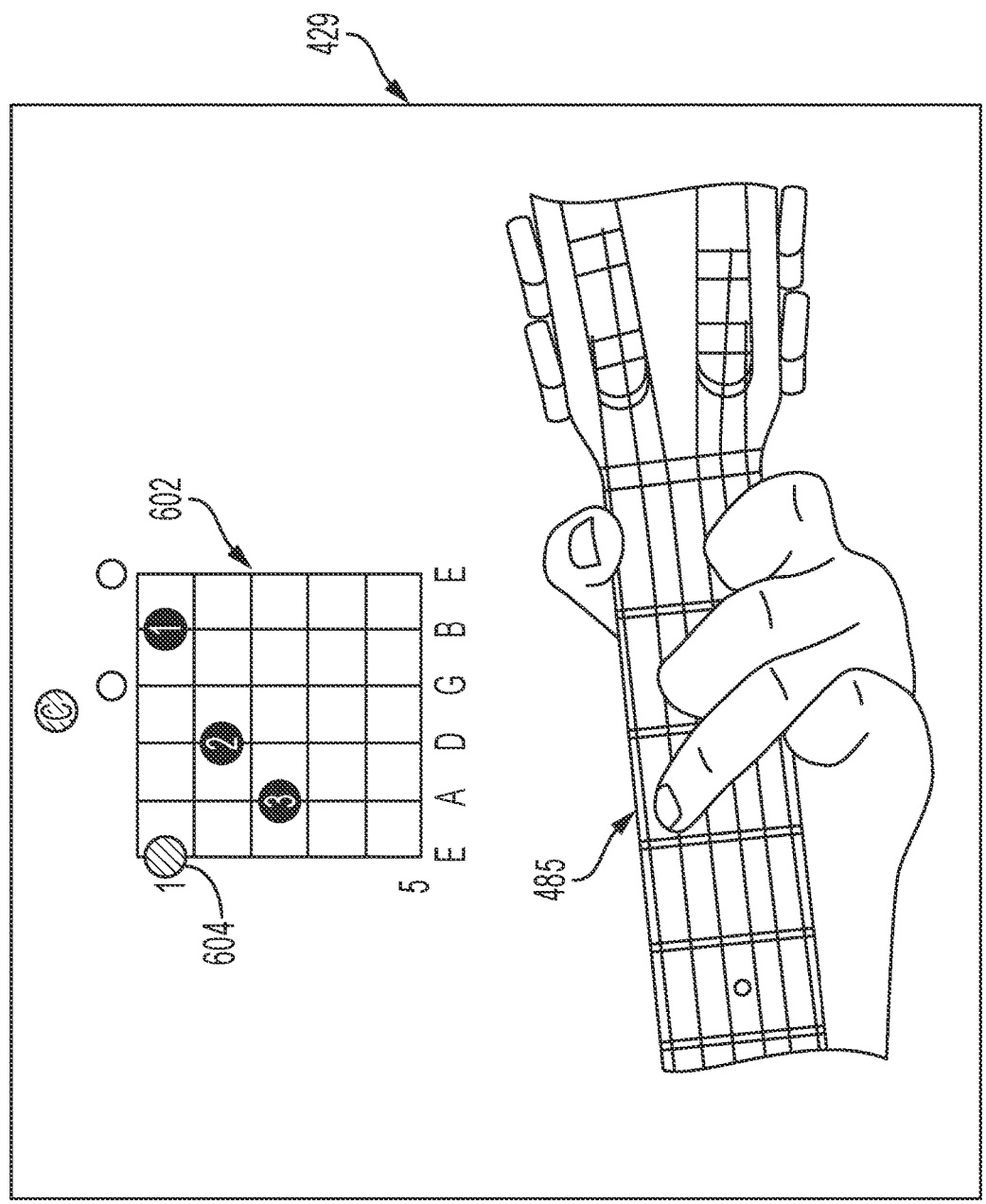
FIG. 9 depicts an incorrectly performed user activity according to one or more embodiments of the present invention.
Figure 10:
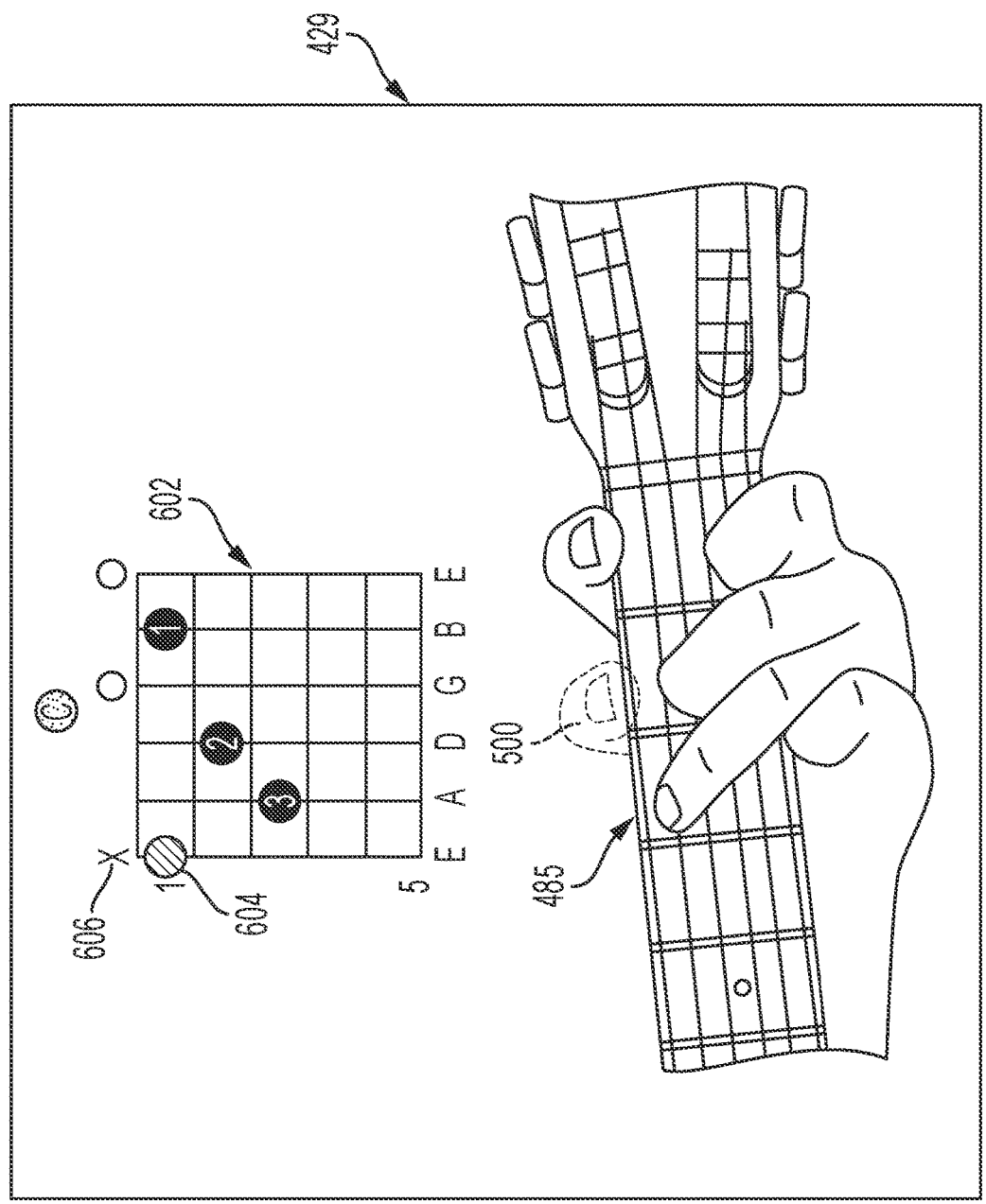
FIG. 10 depicts an image of the incorrectly performed user activity overlaid with the correct modeled user activity according to one or more embodiments of the present invention.

FIGS. 8, 9 and 10 collectively depict an example of a task as a user playing guitar according to another non-limiting embodiment. As mentioned herein, a user can input a level of difficulty corresponding to a selected task to be performed. For example, previously described FIGS. 5, 6 and 7 can correspond to a user inputting a request to play a particular song corresponding to a beginner's level. Accordingly, the AI user activity guidance system 400 can obtain learned modeled images of barre chords from the domain knowledge 412.

When, however, the user inputs a request to play the song according to a more advanced level, the AI user activity guidance system 400 can obtain learned modeled images 600 of open major/minor chords (e.g., open guitar C chord) from the domain knowledge 412 (see FIG. 8), which may be more complicated to play compared to barre chords.

At FIG. 9, the GUI 429 displays image/video data 485 of an ongoing task 434 (e.g., a user playing a desired song on a guitar) performed in real-time, where the user incorrectly performs an open C chord. The chord diagram 602 includes an indicator 604 showing user pressing an incorrect string.

At FIG. 10, the GUI 429 displays an augmented image 500 that is overlaid on real-time image/video data 485. As described herein, the augmented image 500 shows the user how to correctly perform the open chord (e.g., the correct open C chord) in order to correctly progress the task or complete the task according to a more advanced difficulty level. The GUI 429 also displays a chord diagram 602 including correction indicators 606 indicating how to correct the act, e.g., correctly play the open C chord.

As described herein, the AI user activity guidance system 400 can monitor the images of an ongoing task 432 and predict the next act included in the ongoing task 432. Accordingly, an augmented image 500 can be generated informing the user of the next act to be performed in the ongoing task 432.

Figure 11:
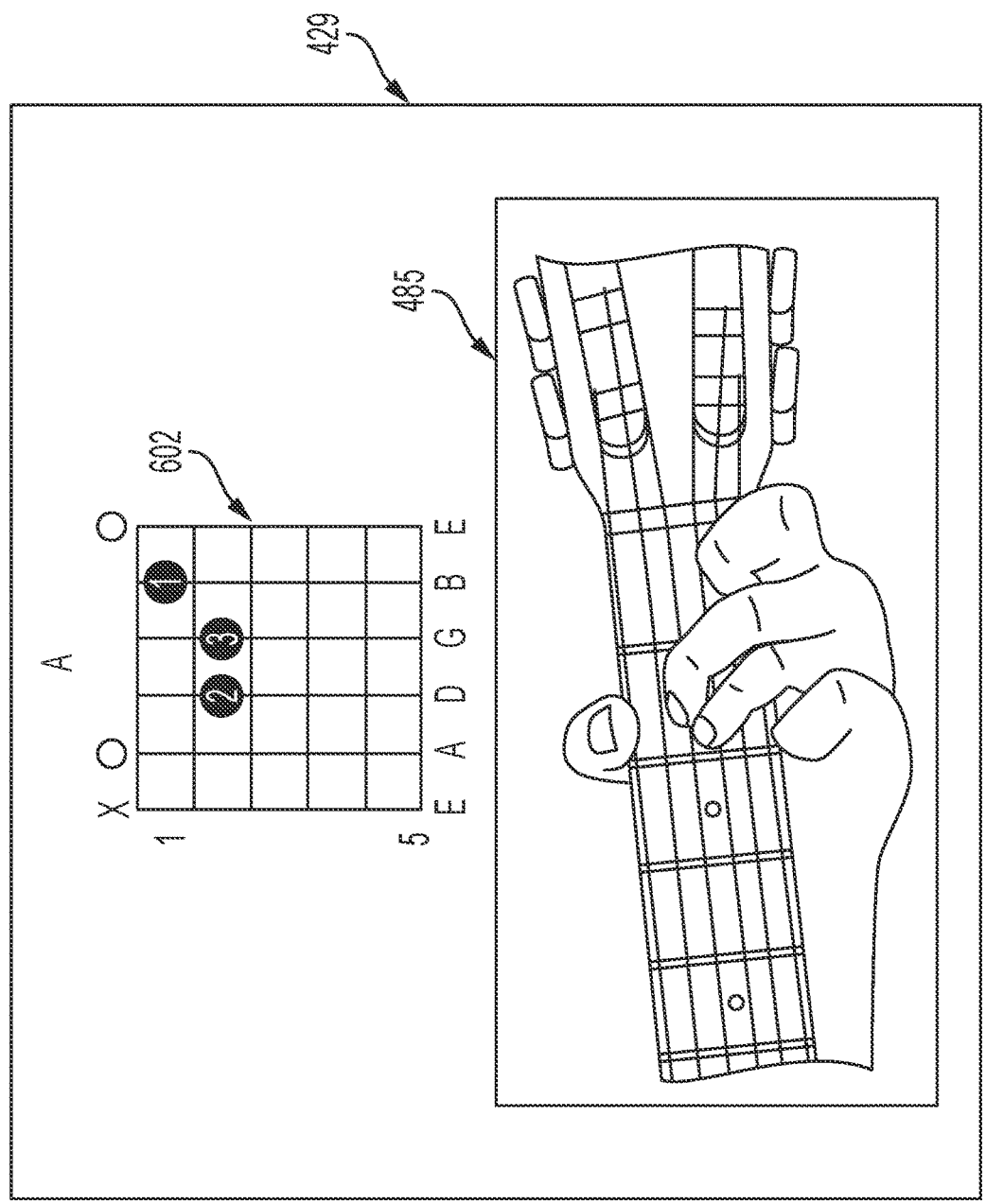
FIG. 11 depicts an image of a performed user activity included in a task according to one or more embodiments of the present invention.
Figure 12:
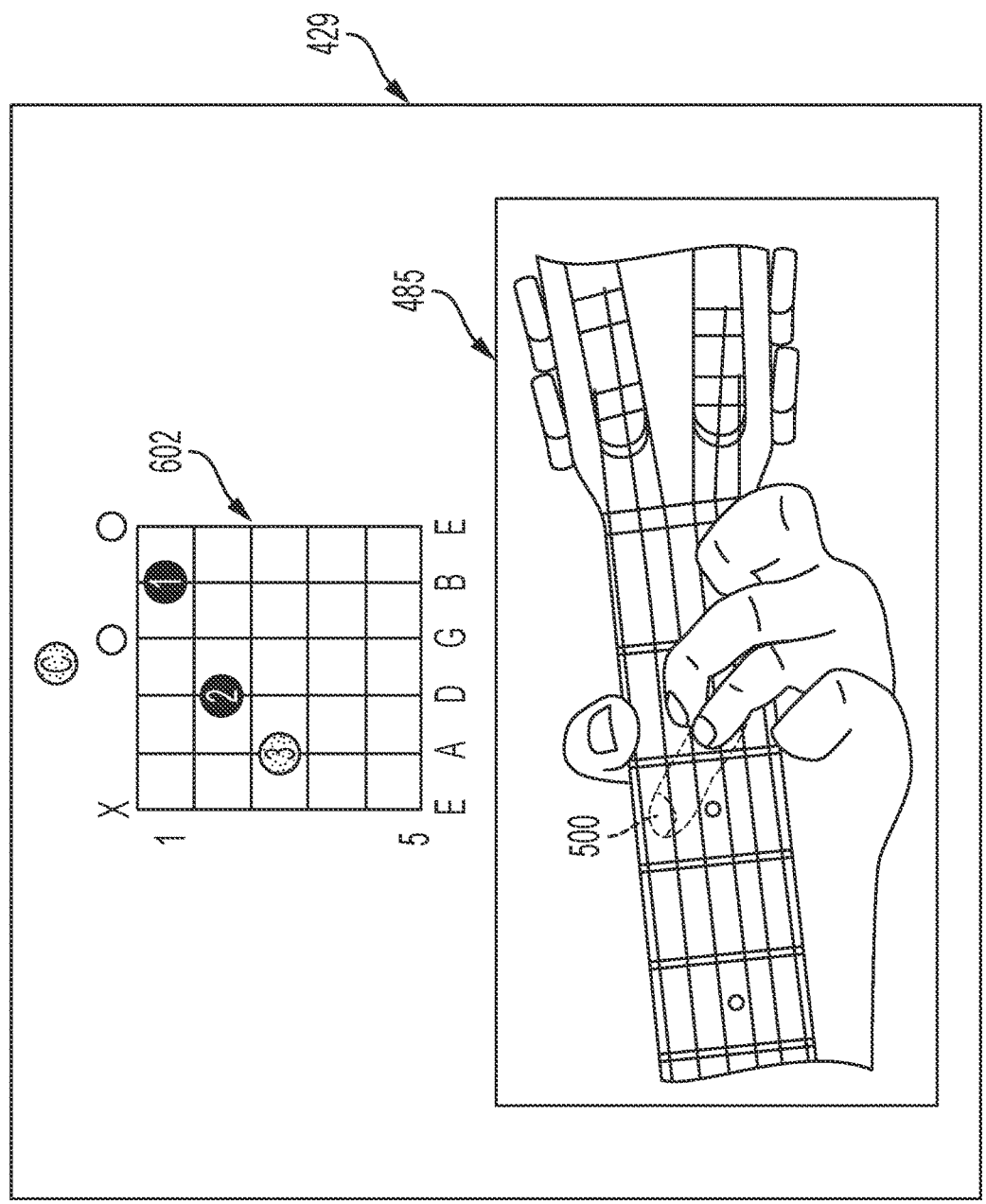
FIG. 12 depicts an image of the performed user activity shown in FIG. 11 overlaid with the next user activity included in the task according to one or more embodiments of the present invention.

FIGS. 11 and 12 collectively depict the AI user activity guidance system 400 predicting the next guitar chord to be played in an ongoing song performed by a user. At FIG. 11, for instance, the GUI 429 displays image/video data 485 of user playing an open A chord including in a song that the user is performing in real-time. As the song progresses, the AI user activity guidance system 400 recognizes that the next chord in the song is an open C chord. Accordingly, the AI user activity guidance system 400 actively generates an augmented image 500 as shown in FIG. 12. The augmented image 500 is overlaid on the image/video data 485 to inform or direct the user how to transition from the current act (e.g., the openly played A chord) to the next act in the task (e.g., the open C chord). In this manner, the user can continue playing the song accurately without moving their attention away from the ongoing task.

Figure 13:
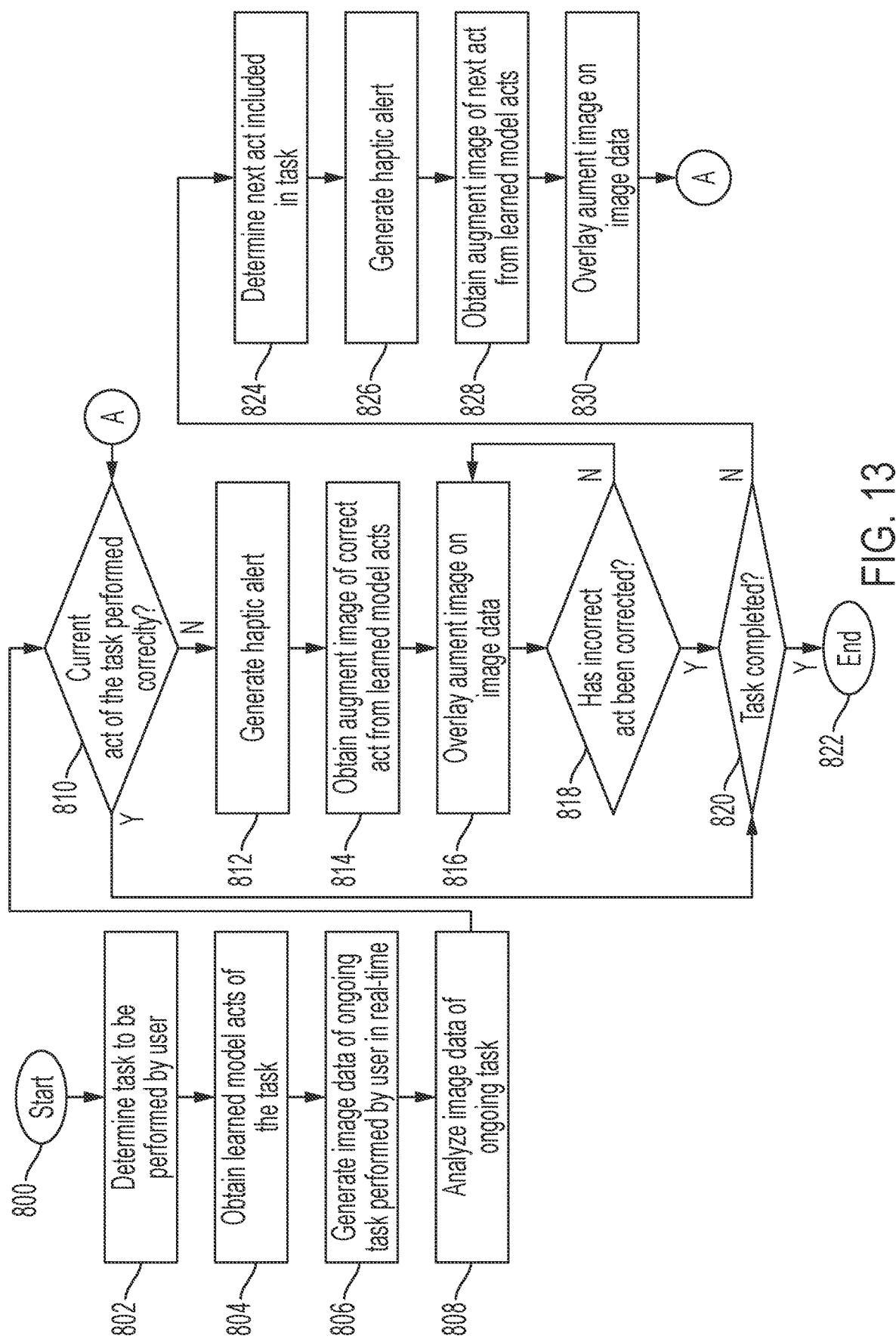
FIG. 13 is a flow diagram illustrating a method performed by an AI user activity guidance system for recommending guidance instructions to a user according to one or more embodiments of the present invention.

Turning now to FIG. 13, a method of recommending guidance instructions by an AI user activity guidance system 400 to a user is illustrated according to one or more embodiments of the present invention. The method begins at operation 800, and at operation 802 the AI user activity guidance system 400 determines a task to be performed by a user. The task can include a plurality of user acts to be performed by the user and can be determined in response to receiving an input (e.g., touch input, vocal input, etc.) by the user indicating the task. At operation 804, the AI user activity guidance system 400 obtains one or more learned model acts included in the task. The learned model acts can be obtained from a domain knowledge 412. In one or more non-limiting embodiments, the learned model acts include images indicative of exemplary or correct performances of the act. At operation 806, the AI user activity guidance system 400 generates image data of the ongoing task performed by the user in real-time. The image data can include, for example, a video stream generated by a camera monitoring the ongoing task.

Turning to operation 808, the AI user activity guidance system 400 analyzes the image data of the ongoing task and at operation 810 determines whether a current act included in the ongoing task is performed correctly. When the act is performed correctly, the AI user activity guidance system 400 determines whether the task is completed, i.e., whether all the acts included in the tasks have been performed. When the task is completed, the method ends. Otherwise, the AI user activity guidance system 400 proceeds to operation 824 to determine the next act included in the task, which is discussed in greater detail below.

When, however, the act is performed incorrectly, the AI user activity guidance system 400 generates a haptic alert at operation 812, which indicates that the current act is performed incorrectly. At operation 814, the AI user activity guidance system 400 access the domain knowledge 412 to obtain the learned modeled image of the correct act, which will be used to augment the image data. At operation 816, the AI user activity guidance system 400 augments the image data by overlaying the learned modeled image on the image data. Accordingly, the user viewing the GUI 429 can discern how to correct the current incorrectly performed act. At operation 818, the AI user activity guidance system 400 analyzes the image data to determine whether the user has adjusted their performance to correct their act based on the augmented image. When the incorrect act has not been correct, the method returns to operation 816 and continues overlaying the learned modeled image on the image data until the user correct the incorrect act. When incorrect act is corrected, the method proceeds to operation 820 to determine whether the task is completed. When the task is completed, the method ends at operation 822.

When the task is not completed, the AI user activity guidance system 400 determines the next act included in the task at operation 824. At operation 826, the AI user activity guidance system 400 generates a haptic alert informing the user that the next act in the task is to be performed. At operation 828, the AI user activity guidance system 400 access the domain knowledge 412 to obtain the learned modeled image of the next act included in the task, which will be used to augment the image data. At operation 830, the AI user activity guidance system 400 augments the image data by overlaying the learned modeled image of the next act on the image data. Accordingly, the user viewing the GUI 429 can quickly move to the next act included in the task without turning their attention away from the ongoing task. The method returns to operation 810 where the AI user activity guidance system 400 analyzes whether the next act is performed correctly, and the method continues as described above.

Additional details of machine learning techniques that can be used to implement portions of the computer system/server 12 will now be provided. The various types of computer control functionality (e.g., estimates, determinations, decisions, recommendations, and the like of the computer system/server 12) described herein can be implemented using machine learning and/or natural language processing techniques. In general, machine learning techniques are run on so-called "neural networks," which can be implemented as programmable computers configured to run a set of machine learning algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include detecting people/faces in images, recognizing facial expressions (e.g., angry, joyful, etc.) in an image, identifying objects in images (e.g., stop signs, pedestrians, lane markers, etc.), recognizing gestures in video, detecting musical instrumentation and instrument manipulation, detecting hand activity (e.g., cooking, cross-stitching, sewing, etc.) detecting voices, detecting voices in audio, identifying particular speakers, transcribing speech into text, and the like. Clustering tasks identify similarities between objects, which it groups according to those characteristics in common and which differentiate them from other groups of objects. These groups are known as "clusters."

An example of machine learning techniques that can be used to implement aspects of the invention will be described with reference to FIGS. 14 and 15. Machine learning models configured and arranged according to embodiments of the invention will be described with reference to FIG. 14. Detailed descriptions of an example computing system and network architecture capable of implementing one or more of the embodiments of the invention described herein will be provided with reference to FIG. 16.

Figure 14:
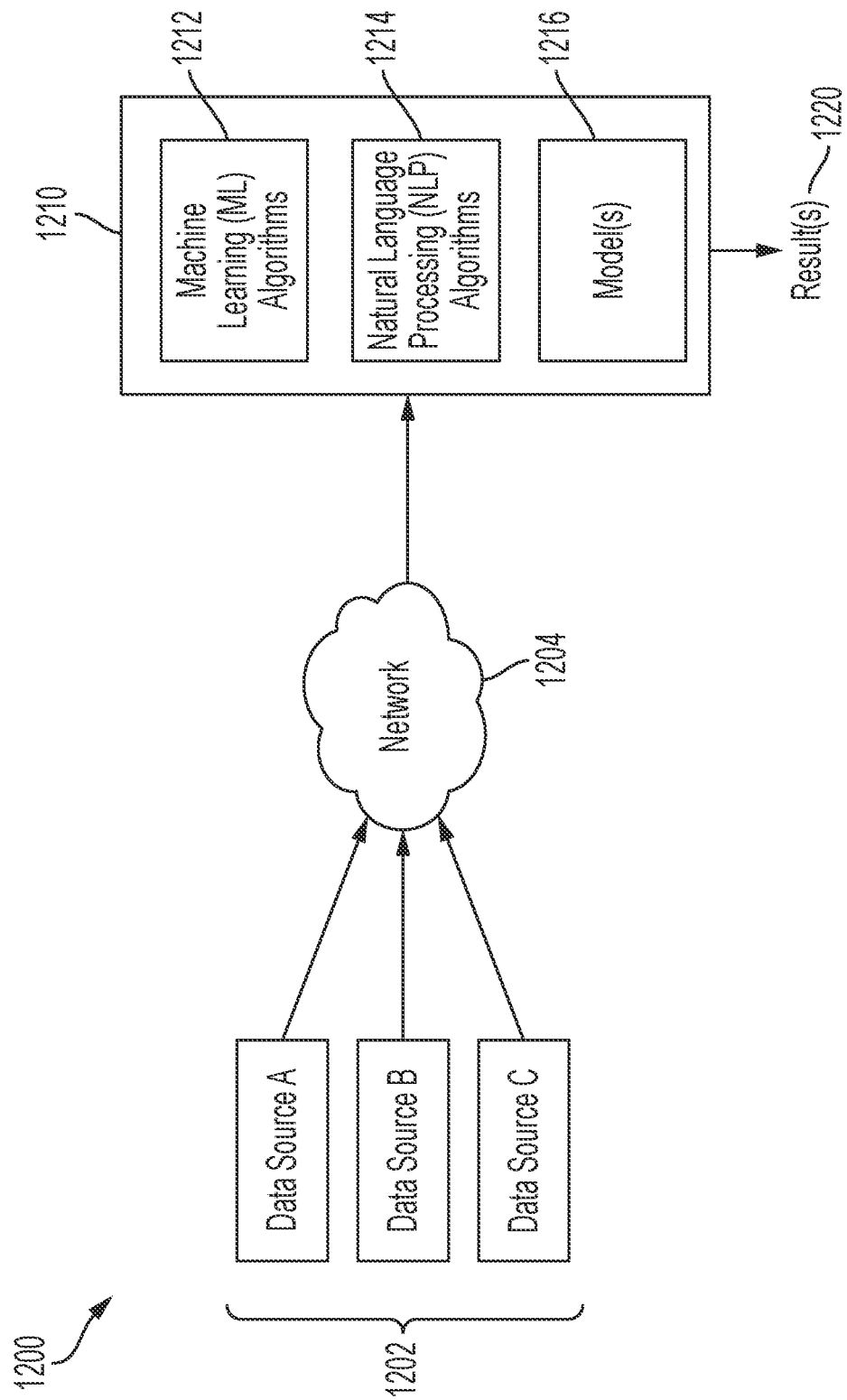
FIG. 14 depicts a machine learning system that can be utilized to implement various embodiments of the invention.

FIG. 14 depicts a block diagram showing a classifier system 1200 capable of implementing various aspects of the invention described herein. More specifically, the functionality of the system 1200 is used in embodiments of the invention to generate various models and sub-models that can be used to implement computer functionality in embodiments of the invention. The system 1200 includes multiple data sources 1202 in communication through a network 1204 with a classifier 1210. In some aspects of the invention, the data sources 1202 can bypass the network 1204 and feed directly into the classifier 1210. The data sources 1202 provide data/information inputs that will be evaluated by the classifier 1210 in accordance with the embodiments of the invention. The data sources 1202 also provide data/information inputs that can be used by the classifier 1210 to train and/or update model(s) 1216 created by the classifier 1210. The data sources 1202 can be implemented as a wide variety of data sources, including but not limited to, sensors configured to gather real time data, data repositories (including training data repositories), cameras, and outputs from other classifiers. The network 1204 can be any type of communications network, including but not limited to local networks, wide area networks, private networks, the Internet, and the like.

Figure 16:
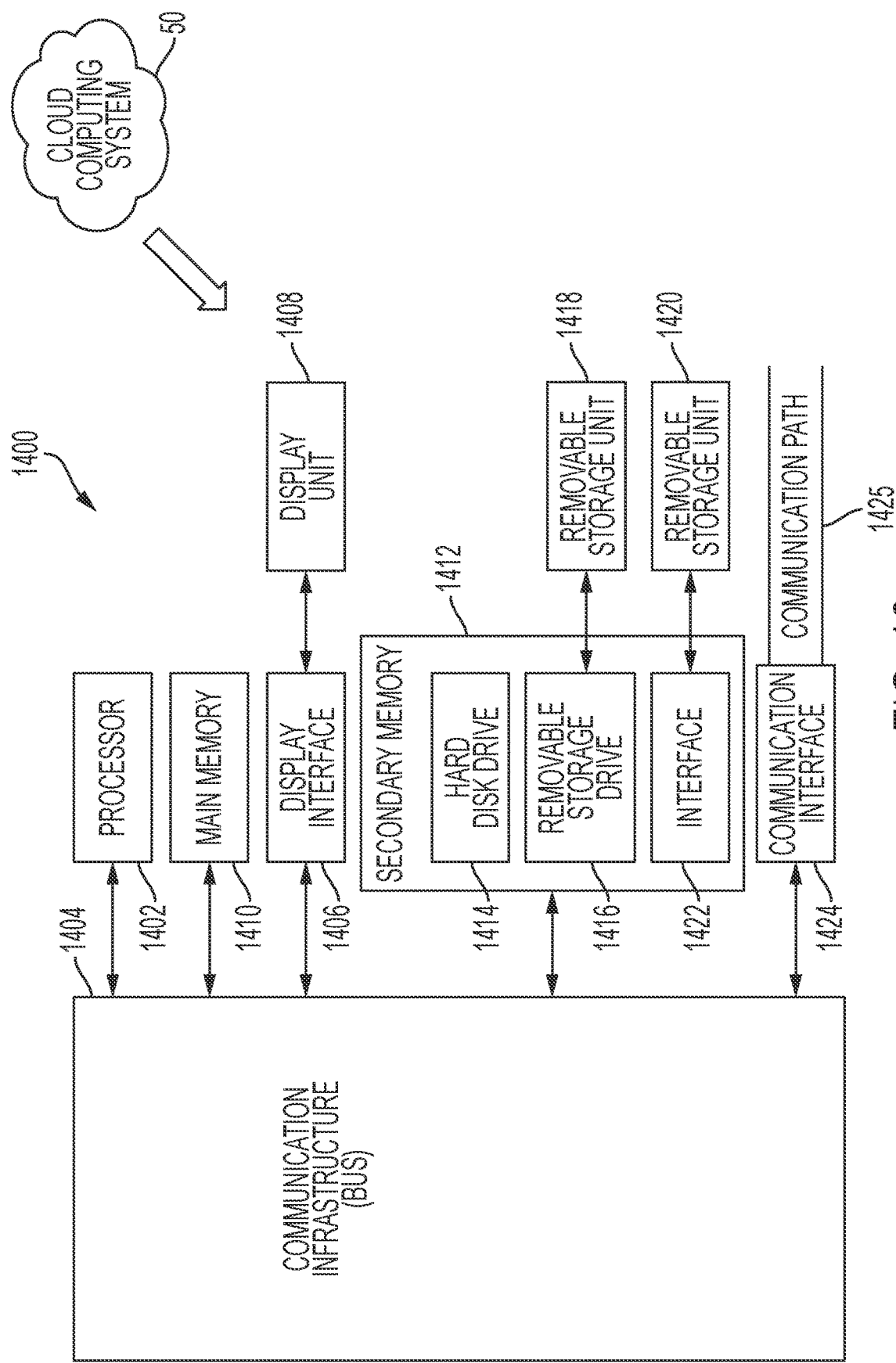
FIG. 16 depicts an exemplary computing system capable of implementing various embodiments of the invention.

The classifier 1210 can be implemented as algorithms executed by a programmable computer such as a processing system 1400 (shown in FIG. 16). As shown in FIG. 14, the classifier 1210 includes a suite of machine learning (ML) algorithms 1212; natural language processing (NLP) algorithms 1214; and model(s) 1216 that are relationship (or prediction) algorithms generated (or learned) by the ML algorithms 1212. The algorithms 1212, 1214, 1216 of the classifier 1210 are depicted separately for ease of illustration and explanation. In embodiments of the invention, the functions performed by the various algorithms 1212, 1214, 1216 of the classifier 1210 can be distributed differently than shown. For example, where the classifier 1210 is configured to perform an overall task having sub-tasks, the suite of ML algorithms 1212 can be segmented such a portion of the ML algorithms 1212 executes each sub-task and a portion of the ML algorithms 1212 executes the overall task. Additionally, in some embodiments of the invention, the NLP algorithms 1214 can be integrated within the ML algorithms 1212.

The NLP algorithms 1214 include speech recognition functionality that allows the classifier 1210, and more specifically the ML algorithms 1212, to receive natural language data (text and audio) and apply elements of language processing, information retrieval, and machine learning to derive meaning from the natural language inputs and potentially take action based on the derived meaning. The NLP algorithms 1214 used in accordance with aspects of the invention can also include speech synthesis functionality that allows the classifier 1210 to translate the result(s) 1220 into natural language (text and audio) to communicate aspects of the result(s) 1220 as natural language communications.

The NLP and ML algorithms 1214, 1212 receive and evaluate input data (i.e., training data and data-under-analysis) from the data sources 1202. The ML algorithms 1212 includes functionality that is necessary to interpret and utilize the input data's format. For example, where the data sources 1202 include image data, the ML algorithms 1212 can include visual recognition software configured to interpret image data. The ML algorithms 1212 apply machine learning techniques to received training data (e.g., data received from one or more of the data sources 1202, images and/or sounds extracted from a video stream, etc.) in order to, over time, create/train/update one or more models 1216 that model the overall task and the sub-tasks that the classifier 1210 is designed to complete.

Figure 15:
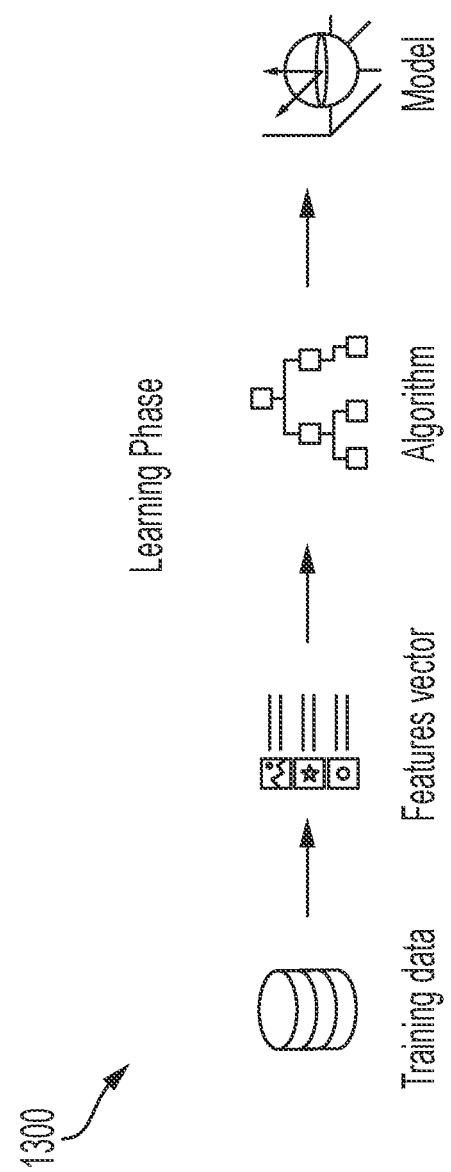
FIG. 15 depicts a learning phase that can be implemented by the machine learning system shown in FIG. 14.

Referring now to FIGS. 14 and 15 collectively, FIG. 15 depicts an example of a learning phase 1300 performed by the ML algorithms 1212 to generate the above-described models 1216. In the learning phase 1300, the classifier 1210 extracts features from the training data and converts the features to vector representations that can be recognized and analyzed by the ML algorithms 1212. The features vectors are analyzed by the ML algorithm 1212 to "classify" the training data against the target model (e.g., correct "models of an act included in a task or the model's task) and uncover relationships between and among the classified training data. Examples of suitable implementations of the ML algorithms 1212 include but are not limited to neural networks, support vector machines (SVMs), logistic regression, decision trees, hidden Markov Models (HMMs), etc. The learning or training performed by the ML algorithms 1212 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 1210 and the ML algorithms 1212. Unsupervised learning can utilize additional learning/training methods including, for example, clustering, anomaly detection, neural networks, deep learning, and the like.

When the models 1216 are sufficiently trained by the ML algorithms 1212, the data sources 1202 that generate "real world" data are accessed, and the "real world" data is applied to the models 1216 to generate usable versions of the results 1220. In some embodiments of the invention, the results 1220 can be fed back to the classifier 1210 and used by the ML algorithms 1212 as additional training data for updating and/or refining the models 1216.

In aspects of the invention, the ML algorithms 1212 and the models 1216 can be configured to apply confidence levels (CLs) to various ones of their results/determinations (including the results 1220) in order to improve the overall accuracy of the particular result/determination. When the ML algorithms 1212 and/or the models 1216 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 1210 can be configured to apply confidence levels (CLs) to the results 1220. When the classifier 1210 determines that a CL in the results 1220 is below a predetermined threshold (TH) (i.e., CL<TH), the results 1220 can be classified as sufficiently low to justify a classification of "no confidence" in the results 1220. If CL>TH, the results 1220 can be classified as sufficiently high to justify a determination that the results 1220 are valid. Many different predetermined TH levels can be provided such that the results 1220 with CL>TH can be ranked from the highest CL>TH to the lowest CL>TH.

The functions performed by the classifier 1210, and more specifically by the ML algorithm 1212, can be organized as a weighted directed graph, wherein the nodes are artificial neurons (e.g. modeled after neurons of the human brain), and wherein weighted directed edges connect the nodes. The directed graph of the classifier 1210 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 1210 can perform unsupervised deep-learning for executing the assigned task(s) of the classifier 1210.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 1210 processes data records (e.g., outputs from the data sources 1202) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 1210 and used to modify the weighted directed graph's weighted connections the second time around, and this feedback process continues for many iterations. In the training phase of a weighted directed graph of the classifier 1210, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 16 depicts a high level block diagram of the computer system 1400, which can be used to implement one or more computer processing operations in accordance with aspects of the present invention. Although one exemplary computer system 1400 is shown, computer system 1400 includes a communication path 1425, which connects computer system 1400 to additional systems (not depicted) and can include one or more wide area networks (WANs) and/or local area networks (LANs) such as the Internet, intranet(s), and/or wireless communication network(s). Computer system 1400 and the additional systems are in communication via communication path 1425, e.g., to communicate data between them. In some embodiments of the invention, the additional systems can be implemented as one or more cloud computing systems 50. The cloud computing system 50 can supplement, support or replace some or all of the functionality (in any combination) of the computer system 1400, including any and all computing systems described in this detailed description that can be implemented using the computer system 1400. Additionally, some or all of the functionality of the various computing systems described in this detailed description can be implemented as a node of the cloud computing system 50.

Computer system 1400 includes one or more processors, such as processor 1402. Processor 1402 is connected to a communication infrastructure 1404 (e.g., a communications bus, cross-over bar, or network). Computer system 1400 can include a display interface 1406 that forwards graphics, text, and other data from communication infrastructure 1404 (or from a frame buffer not shown) for display on a display unit 1408. Computer system 1400 also includes a main memory 1410, preferably random access memory (RAM), and can also include a secondary memory 1412. Secondary memory 1412 can include, for example, a hard disk drive 1414 and/or a removable storage drive 1416, representing, for example, a floppy disk drive, a magnetic tape drive, or an optical disk drive. Removable storage drive 1416 reads from and/or writes to a removable storage unit 1418 in a manner well known to those having ordinary skill in the art. Removable storage unit 1418 represents, for example, a floppy disk, a compact disc, a magnetic tape, or an optical disk, flash drive, solid state memory, etc. which is read by and written to by removable storage drive 1416. As will be appreciated, removable storage unit 1418 includes a computer readable medium having stored therein computer software and/or data.

In alternative embodiments of the invention, secondary memory 1412 can include other similar means for allowing computer programs or other instructions to be loaded into the computer system. Such means can include, for example, a removable storage unit 1420 and an interface 1422. Examples of such means can include a program package and package interface (such as that found in video game devices), a removable memory chip (such as an EPROM, or PROM) and associated socket, and other removable storage units 1420 and interfaces 1422 which allow software and data to be transferred from the removable storage unit 1420 to computer system 1400.

Computer system 1400 can also include a communications interface 1424. Communications interface 1424 allows software and data to be transferred between the computer system and external devices. Examples of communications interface 1424 can include a modem, a network interface (such as an Ethernet card), a communications port, or a PCM-CIA slot and card, etcetera. Software and data transferred via communications interface 1424 are in the form of signals which can be, for example, electronic, electromagnetic, optical, or other signals capable of being received by communications interface 1424. These signals are provided to communications interface 1424 via communication path (i.e., channel) 1425. Communication path 1425 carries signals and can be implemented using wire or cable, fiber optics, a phone line, a cellular phone link, an RF link, and/or other communications channels.

Technical benefits include an improved functionality of AI computing system, which is capable of learning various different user acts necessary for performing a given task, monitoring a user's acts performed in real-time for achieving a desired task, and recommending guidance to the user on how to correctly perform one or more of the acts to achieve the task. In one or more non-limiting embodiments, the AI user activity guidance system performs imaging of a user's acts while they perform the task in real-time and detects an incorrectly performed act. A display is provided that displays images of the user performing the acts of the task in real-time. In response to detecting the incorrectly performed act, the AI user activity guidance system generates a haptic alert that alerts the user that a current act is performed incorrectly, and generates a recommendation output indicating a correction to the incorrectly performed act. The recommendation output includes spoken directions guiding the user on how to correct the incorrectly performed act and/or an augmented image that is overlaid atop the images shown on the display indicating the correct act. In this manner, the user can easily correct their act without stopping and/or moving their attention from the ongoing task. Accordingly, the AI user activity guidance system described herein facilitates the ability for users to complete tasks more quickly while avoiding errors in the completed tasks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory having computer readable instructions; and
   one or more processors for executing the computer readable instructions, the computer readable instructions controlling the one or more processors to perform operations comprising:
     monitoring an ongoing task comprising at least one act performed by a user among a plurality of acts to be performed by the user in a progression to accurately complete the ongoing task;
     generating image data depicting the ongoing task;
     displaying the ongoing task based on the image data;
     analyzing the ongoing task and predicting a next act in the progression;
     detecting the user inaccurately performs the ongoing task in response to detecting the predicted next act is performed incorrectly by the user;
     in response to detecting the predicted next act is performed incorrectly, generating an augmented image that depicts at least a portion of the ongoing task and that is a corrected image depicting a correction of the predicted next act; and
     overlaying the augmented image on the image data so that the augmented image is displayed simultaneously with the predicted next act to direct the user to accurately progress the ongoing task.

2. The system of claim 1, further comprising generating a haptic alert in response to detecting the at least one act is performed incorrectly.

3. The system of claim 1, wherein the augmented image is generated in response to determining a next act among the at least one act included in the task.

4. The system of claim 3, wherein the augmented image is an image depicting the next act.

5. The system of claim 4, further comprising generating a haptic alert in response to determining the next act.

6. A method for recommending guidance instructions to a user, the method comprising:
   monitoring an ongoing task comprising at least one act performed by a user among a plurality of acts to be performed by the user in a progression to accurately complete the ongoing task;
   generating image data depicting the ongoing task;
   displaying the ongoing task based on the image data;
   analyzing the ongoing task and predicting a next act in the progression;
   detecting the user inaccurately performs the ongoing task in response to detecting the predicted next act is performed incorrectly by the user;
   in response to detecting the predicted next act is performed incorrectly, generating an augmented image that depicts at least a portion of the ongoing task and that is a corrected image depicting a correction of the at predicted next act;
   overlaying the augmented image on the image data so that the augmented image is displayed simultaneously with the predicted next act to direct the user to accurately progress the ongoing task.

7. The method of claim 6, further comprising generating a haptic alert in response to detecting the at least one act is performed incorrectly.

8. The method of claim 6, further comprising:
  determining a next act among the at least one act included in the task; and
  generating the augmented image in response to determining the next act among the at least one act included in the task.

9. The method of claim 8, wherein the augmented image is an image depicting the next act.

10. The method of claim 9, further comprising generating a haptic alert in response to determining the next act.

11. A computer program product for recommending guidance instructions to a user, the computer program product comprising:
  a computer readable storage medium having program instructions embodied therewith, the program instructions readable by a processing circuit to cause the processing circuit to perform operations comprising:
    monitoring an ongoing task comprising at least one act performed by a user among a plurality of acts to be performed by the user in a progression to accurately complete the ongoing task;
    generating image data depicting the ongoing task;
    displaying the ongoing task based on the image data;
    analyzing the ongoing task and predicting a next act in the progression;
    detecting the user inaccurately performs the ongoing task in response to detecting the predicted next act is performed incorrectly by the user;
    in response to detecting the predicted next act is performed incorrectly, generating an augmented image that depicts at least a portion of the ongoing task and that is a corrected image depicting a correction of the predicted next act; and
    overlaying the augmented image on the image data so that the augmented image is displayed simultaneously with the predicted next act to direct the user to accurately progress the ongoing task.

12. The computer program product of claim 11, further comprising generating a haptic alert in response to detecting the at least one act is performed incorrectly.

13. The computer program product of claim 11, further comprising:
  determining a next act among the at least one act included in the task; and
  generating the augmented image of the next act in response to determining the next act among the at least one act included in the task.

14. The computer program product of claim 13, further comprising generating a haptic alert in response to determining the next act.

* * * * *